LAWN SPRINKLING SYSTEM
Filed April 24, 1959 2 Sheets-Sheet 1
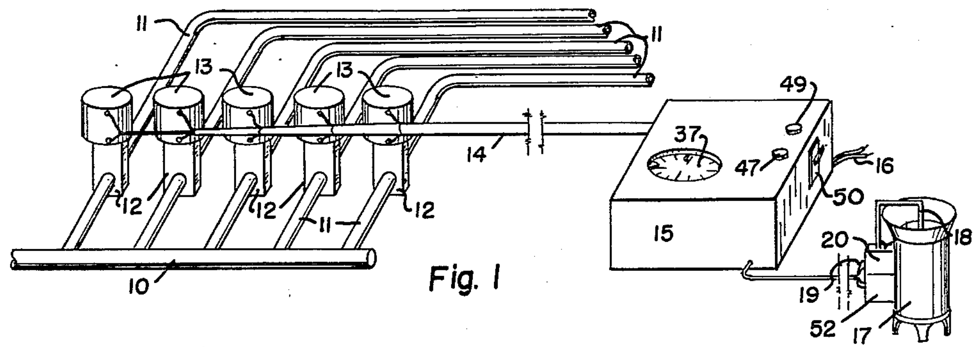
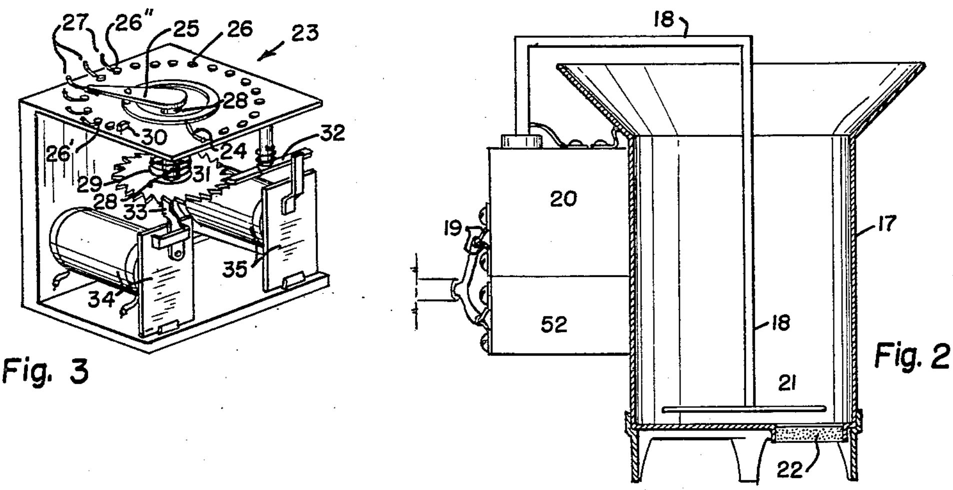
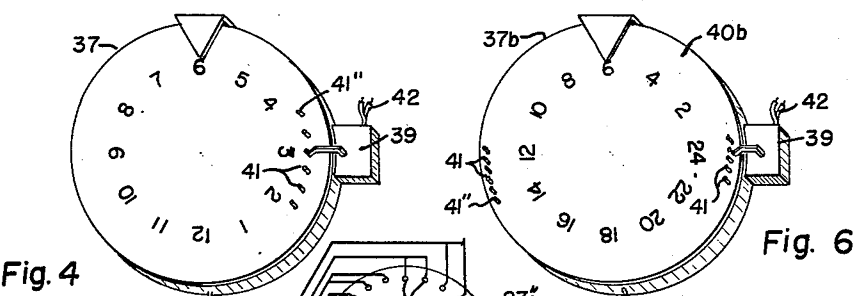
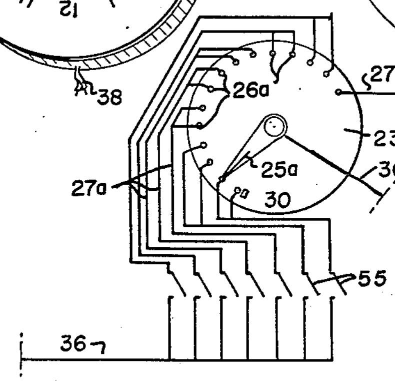
INVENTOR.
ORLO ROTUNDA
BY WHITEHEAD, VOGL & LOWE
PER Frank C. Lowe
ATTORNEYS LAWN SPRINKLING SYSTEM
Filed April 24, 1959 2 Sheets-Sheet 2
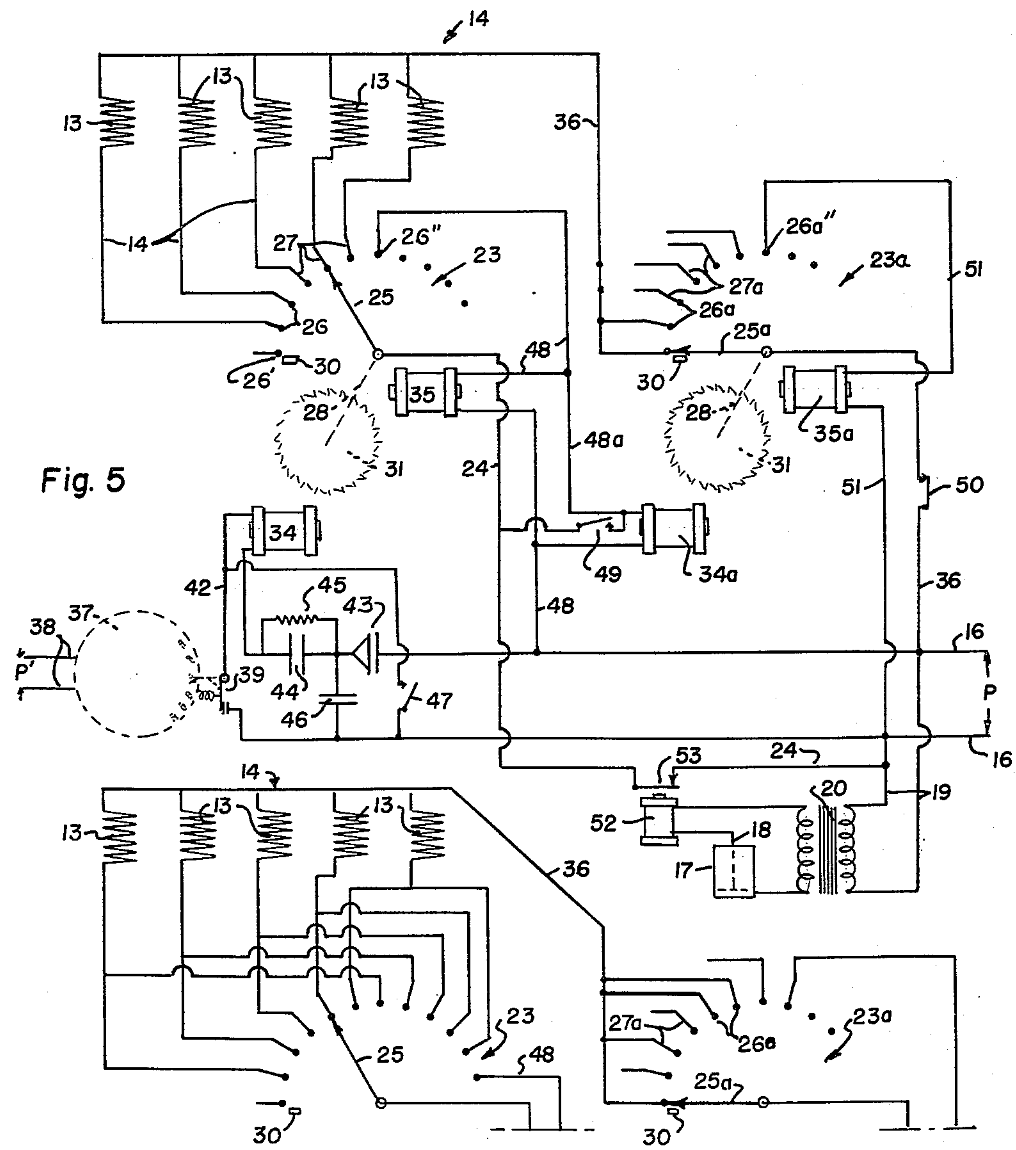
INVENTOR.
ORLO ROTUNDA
BY WHITEHEAD, VOGL & LOWE
PER Frank C. Lowe
ATTORNEYS United States Patent Office 3,118,606 Patented Jan. 21, 1964

3,118,606
LAWN SPRINKLING SYSTEM

Orlo Rotunda, 2301 Brentwood Drive, Greeley, Colo.
Filed Apr. 24, 1959, Ser. No. 814,942
5 Claims. (Cl. 239—63)

This invention relates to water distribution systems of the type which have a plurality of branch lines interconnected with a common supply line with each branch being valved for individual select operation, and more particularly to underground lawn sprinkling systems which incorporate a plurality of individually operable branch lines. A primary object of the invention is to provide, in combination with a branched underground sprinkling system, a novel and improved regulating control apparatus adapted to sequentially operate the individual branches of the sprinkler system in a selected order, according to a predetermined daily schedule and according to a selected alternating sequence of days on a weekly, monthly or seasonal schedule.

Essentially, a lawn sprinkling system of the type herein considered comprises a plurality of conduits extending from a common water supply to branch to various parts of an area to be watered. Water spraying nozzles are connected to the conduits in a selected spaced-apart relation to properly sprinkle and wet down the selected area. Each individual conduit or branch line is controlled by a valve at its head so that the branch line may be turned on and off independently of the flow of water through the other branch lines of the system. This type of system is desirable and necessary where the flow from the water supply line is not sufficient to operate all branches of the system simultaneously, and, ordinarily a branched sprinkling system is designated to provide efficient operation of only one branch line at a time.

A common mode of operating a branched sprinkling system is to open and close the individual branch lines in sequence, each operating for a selected time interval until the entire lawn area is watered. Such sequential operation may be accomplished manually or automatically with several known forms of regulating control apparatus. Such apparatus usually combines a timing mechanism and a valve actuating mechanism in a manner which effects a timed sequential opening and closing of the valves of the various branches. These regulating control apparatus ordinarily include mechanical or electrical components or both. One known type of control apparatus uses solenoid operated valves at the individual branch lines and electrically powered circuits controlled by a timing mechanism operates the solenoid valves in a sequential manner and at selected time intervals. The present invention is a development from and improvement over such a simple solenoid-valve system as hereinafter disclosed in detail.

In many western communities, the scarcity of water has brought about special restrictive meaures and regulations for the watering and irrigation of lawns to insure equitable and efficient use of the available water. The best times for lawn watering are at daybreak and in the evening and many communities restrict lawn watering to the early and late hours of the day. They also restrict lawn watering to alternate days or to a selected pattern of alternating days to permit different residents and different sections of the community to alternatively use the full amount of water and water pressure available. Such systems have real merit for it has been shown that proper lawn sprinkling and irrigation is most effective if several days elapse between waterings.

Regardless of the need and the merits of an early-late watering schedule on alternating days, the establishment of such a restricted watering schedule is very inconvenient for many people. The watering is at inconvenient early and late hours and any alternating daily schedule will be at times confusing because many homeowners get mixed up in the course of their daily activities by unexpected events. It follows that there is a real and definite need for a controlled system which will effect automatic lawn sprinkling; not only an automatic sequential operation of the several branches of the system, but also the various changeable time restrictions and schedules of alternating days that are initiated to conserve and regulate a municipal water supply. With such in view, the present invention was conceived and developed, the fulfillment of such needs being an object of the invention.

Further objects of the invention are to provide a novel and improved regulating control apparatus for a multi-branch lawn sprinkling system which: (*a*) effects selected sequential automatic operation of the several branch lines of the system at selected times and with each branch operating for a selected period; (*b*) may be quickly and easily adjusted to sequentially operate the individual branch lines according to any selected daily schedule and any selected alternating sequence of days of operation, either as alternating days, selected days of week or selected days of the month; (*c*) will not operate whenever rain or other moisture conditions render lawn watering unnecessary; (*d*) will continue to operate automatically according to a selected repeating schedule for an indefinite period but may be easily disrupted and reset whenever it is desirable to intercede the automatic operation and operate the sprinkling system manually; and (*e*) will provide a simple, neat, compact, fool-proof, low-cost apparatus that will operate for a long period of time at a minimum of maintenance.

With the foregoing and other objects in view, all of which more fully hereinafter appear, my invention comprises certain novel and improved constructions, combinations and arrangements of parts, elements and circuits, as hereinafter described and as defined in the appended claims and illustrated in the accompanying drawing in which:

FIGURE 1 is a diagrammatic three-dimensional view of a portion of a sprinkler system as constructed in accordance with the invention, illustrating a supply line and branch lines connected thereto and illustrating further, diagrammatically, a case containing a regulating control system, and a rainwater container cut-out associated therewith.

FIGURE 2 is a sectional diagrammatic view of a rainwater container cut-out of a type adapted for use in connection with the regulating control apparatus.

FIGURE 3 is a diagrammatic three-dimensional view of a step-reset relay of a type adapted for use in the regulating control apparatus.

FIGURE 4 is a diagrammatic three-dimensional view of a timing control apparatus of a type adapted for use in connection with the invention.

FIGURE 5 is a wiring diagram of the regulating control apparatus and of the connections therewith to other elements of the system.

FIGURE 6 is a diagrammatic plan view of another timing mechanism, similar to FIG. 4, but illustrating an alternate method of operational setup.

FIGURE 7 is a portion of a wiring diagram, similar to FIG. 5, but illustrating an alternate arrangement of circuits for use with the timing mechanism illustrated at FIG. 6.

FIGURE 8 is a wiring diagram of an arrangement of selective cut-out which may be used with the invention.

In essence, the invention combines in the control apparatus for an automatic sprinkler system the features which permit the sprinkler system to operate sequentially for one or more working periods of a day, but to operate only on selected days according to a predetermined schedule. For example, the system may be set up to operate two times a day, at twelve-hour intervals, and to operate only on every third day. The system as illustrated at FIGS. 1 to 5 will be hereinafter described as being set up for such operational sequence.

Referring more particularly to FIG. 1 of the drawing, the water supply pipe 10 terminates as a manifold from whence a plurality of conduits outstand to form the branch lines 11 of the sprinkler system. Although only a portion of the branch lines 11 is shown at FIG. 1, each branch line extends to a selected area and sprinklers or the like, not shown, are connected with each branch line in a conventional manner. Each branch line 11 is controlled by a valve 12 located near the water supply pipe 10.

For automatic operation, each valve 12 is a solenoid-operated type which is normally closed and opens whenever a solenoid 13 associated therewith is energized and which automatically closes when a current is cut off. The group of solenoids 13 is operated by electrical circuits 14 which extend from regulating control apparatus and circuits within a box 15, as illustrated at FIG. 1. The regulating control apparatus and solenoids 13 are operated through a conventional power supply indicated by leads 16 extending into the box 15.

It is undesirable to operate a lawn watering system immediately after a rain for the ground then contains sufficient moisture. To prevent operation of this automatic system after a rainstorm, a rainwater cut-out container 17 may be strategically located near the apparatus for connection with circuits from the control box 15, as hereinafter described. An electrode 18 extends into the container for contact with water collected therein and when such contact is made a current is initiated as from a power source 19. However, because of the high resistance of water, the circuit 19 preferably includes a step-up transformer 20 to obtain enough current in the circuit to operate a relay hereinafter described. To further obtain effective contact with the water, the electrode 18 may include an enlarged head 21 at its base adapted to lie closely near the bottom of the container.

Since water will evaporate from the container at a much slower rate than it will be absorbed through the soil and be dissipated by plants, it is necessary to drain the water from the container 17 soon after a rain, at a selected period of tilme to correlate the draining with the subsequent condition of the earth. To accomplish this, the container 17 may include a porous plug 22, or like drain means, in its bottom which permits the rain water to slowly seep from the container 17. With such draining means, a rain several days previous to the watering period will not prevent operation of the system at the proper time, while a rain immediately prior to the commencement of the operation period will do so.

To effect sequential operation of the solenoid valves 12 according to the invention, the control apparatus includes two step-reset relays 23 and **23*a*, one of which is representatively illustrated at FIG. 3. A step-reset relay of this type is known and is obtainable as a conventional element. Describing the step-reset relay 23 superficially, it includes an input lead 24 which is connected with a radial arm 25. The arm 25 swings to sequentially connect with a plurality of circumferentially spaced contacts 26. A lead 27 extends from each contact 26 to other mechanisms such as, for example, a solenoid 13. The sweep arm 25 is mounted upon a shaft 28 which is resiliently torsioned by a spring 29 to rotate the arm to a selected return position as to a stop 30** whenever the arm is released from any other position of rotation.

Relay-controlled ratchet driving means are incorporated in this step-reset relay 23 to move the arm from one contact 26 to another contact 26. A directional toothed ratchet sprocket 31 is mounted upon the shaft 28 having the pitch of its teeth corresponding with the spacing of the contacts 26. A lock detent 32 is adapted to swing into and to engage the sprocket teeth to lock and hold the wheel against the rotative twist of the spring 29. A driver arm 33 is adapted to engage a sprocket tooth space at a time to advance the arm 25, with the lock detent 32 being reactive to lock the wheel as the arm advances. The driver arm is an extension of the armature of a drive solenoid 34 and an electrical impulse to the solenoid actuates the arm. The armature of a release solenoid 35 is associated with the lock detent 32 to complete the assembly. When this release solenoid 35 is energized, the lock detent 32 is released from the teeth of the wheel to return the arm 25 to stop 30.

As illustrated in the circuit diagram at FIG. 5, the step-reset relay 23 is associated with the solenoids 13 with a sequence of leads 27 forming a portion of the circuits 14, each lead 27 extending to one side of a solenoid 13. It is to be noted that the first contact 26′, at stop 30, has no lead and it is a dead contact. When in this position the water system is closed. However, the contact 26′ may include a lead to an off-indicating light or the like, which is not shown since indicating lights are common, easily-installed expedients in such apparatus.

The circuits 14 from the solenoids include a return lead 36 and this lead 36 and the input lead 24, which include other controls hereinafter described, extend to a power source P at leads 16.

Operation of the apparatus is initiated by a conventional timing mechanism or clock 37 which is preferably electrically operated as by leads 38 which extend to a power source P′ or the power source P by leads not shown. This clock 37 is adapted to actuate a switch 39 at selected time intervals and one form of clock includes a rotatable face disc 40 having switch contact pins 41 on its face. The disc 40 is adapted to effect a complete revolution in a twelve-hour period and by such rotation the switch 39 is tripped by pins 41, there being one pin for each solenoid 13 plus an extra pin 41″ for reset action. The timing of these pins may be in any manner desired. For example, it may be desirable to have the first branch of the sprinkler system commence operation at 5:00 a.m., the second branch 20 minutes later, the third branch 20 minutes after the second, and so on. The cycle will repeat itself twelve hours later, beginning to commence operation at 5:00 p.m.

The switch 39 is located in a circuit 42 which includes the driver solenoid 34 of the step-reset relay 23. The leads of the circuit 42 are suitably interconnected with leads 24 and 36 to be connected with the power source P so that closure of switch 39 energizes the circuit 42.

To control the electrical impulses into the driver solenoid 34 and assure only single-step progressive movement of the arm 25, the circuit 42 may include an R-C pulsing arrangement such as a rectifier 43 in one leg of the circuit 42, a capacitor 44 in this circuit leg, a by-pass resistor 45 at the capacitor 44 and a shunting capacitor 46 between the legs of the circuit 42.

A short-circuiting manually-operated normally-open switch 47 is connected in the leg of circuit 42 around switch 39 to permit electrical impulses to be initiated manually to swing the arm 25 to any desirable contact 26.

When the arm 25 swings to the contact 26″ beyond the solenoid contacts, the arm closes a circuit formed by lead 24 and lead 48. The lead 48 includes a reset solenoid 35 and extends thence to a power supply lead 16. This operation energizes the reset solenoid 35 to return the arm 25 to its initial position at stop 30. A short-circuiting manually-operated normally-open switch 49 is connected across the legs of leads 24 and 48 to permit electrical impulses to be initiated manually to swing the arm 25 to its initial position at stop 30 and to operate a second step-reset relay **23*a***, as hereinafter described.

The step-reset relay **23*a* includes contacts 26*a* which are arranged to control the daily sequence of watering operations. The leads 27*a* of certain of these contacts 26*a*** are connected with the lead 36 from the solenoids 13, while other leads are open or extend only to off-indicator lights, not shown. The sweep arm 25*a* forms a continuation of the lead 36 and that lead continues to the power source P as hereinbefore described.

When the arm 25*a* is upon a contact 26*a* connected with circuit 36, the system operates, but when the arm 25*a* is on a contact 26*a* not so connected, the system will not operate although the clock mechanism and the valve changing step-reset relay 23 continues to operate on the selected twelve-hour schedule to advance the arm 25 from its initial position 26′ over other contacts 26 and to return contact 26″ and then to advance the arm 25*a* to another contact 26*a*. This latter operation is accomplished through a bifurcation of circuit 48 to include a lead 48*a* which extends to the driver solenoid 34*a* of the relay 23*a*. Whenever the circuit 48 is closed by movement of the arm 25 to the contact 26″, the solenoid 34*a* is likewise momentarily energized to move the arm 25*a* to a subsequent contact 26*a*. A normally-closed manually-operated switch 50 is interposed in this lead 36 at any selected position so that it may be opened to stop all operation of the system.

A final contact point 26*a*″ in the sequence of the relay 23*a* closes a lead 51 which includes the release solenoid 35*a* and extends thence to the power source P to complete the circuit with a portion of the lead 36. When this circuit closes, the arm 25*a* swings back to starting position to stop 30*a* to commence another day schedule cycle.

The operation of the apparatus to move the arm 25*a* from one contact 26*a* to the next is effected by a complete cycle of the clock movement 37 in the manner hereinbefore described. With the clock on twelve-hour rotation, two contacts 26*a* are required to establish a one-day operational period—one contact 26*a* for the morning and the second contact for the evening, twelve hours later.

The rain-indicating container hereinbefore described is preferably set in the power lead circuit at any convenient location as in the lead 24 with the transformer 20 providing sufficient voltage through the cutoff lead 19 to energize a relay 52 for opening of normally-closed relay switch 53 which is in the power circuit as in lead 24. When sufficient water is in the container to cause current to flow to the circuit 19, the switch 53 opens, but when the water has drained from the container or has evaporated, the switch 53 again closes.

FIGS. 6 and 8 show an alternate form of a clock 37*b* and leads 27 and 27*a* are modified to provide a different operating schedule. Here the clock 37*b* is formed with a twenty-four hour faced disc 40*b* having two sets of pins 41 representing morning and evening operation, but they do not require a twelve-hour spacing apart as the construction hereinbefore described does. The clock 37*b* may have a selected operational schedule as shown, such as starting at 5:00 a.m. and 6:00 p.m. In this arrangement, two sets of leads 27 extend to each solenoid 13 from the contact 26 and each contact 26*a* of the day control step-reset relay indicates a one-day operating period and these one-day operating periods may be arranged in any manner desired such as by using seven contacts 26*a* and to set up a seven-day sequential operation, such as, for example, having watering periods Monday, Wednesday, Friday and Saturday, as indicated by the selected completed contacts 27*a*.

A further modification of the arrangement herein disclosed is to provide means for quickly shifting the alternating daily schedules of the step-reset relay 33*a* in the manner indicated at FIG. 8. The circuit 36 may be connected with the various leads 27*a*, but with manually-operable switches 55 in the leads which may be used to obtain any daily pattern, as for a weekly schedule.

Various other arrangements and modifications of the apparatus and circuits hereinbefore described are possible which, however, do not depart from the spirit of my invention and hence I desire that my protection be limited not by the constructions and details herein described and illustrated, but only by the proper scope of the appended claims.

I claim:

1. In a time control system, for a lawn sprinkler system or the like, having a plurality of branch lines with a two-lead electrically operable control at each branch, an electrical switching circuit adapted to provide a programmed cycle of sequential operation of the controls as during a selected period of a day, with recurrence of the cycle over an extended time period as on selected days of a week and including in combination with the branch controls, a stepper means having a series of contacts and a sweep arm, timing means adapted to shift the sweep arm from one contact to the next at selected time intervals of a day, said contacts including a starter contact, intermediate contacts and a terminating contact, a lead from each intermediate contact to a lead of a branch control, electrical-impulse-actuated reset means with the terminating contact adapted to return the shift arm to the starter contact, a second stepper means having a series of contacts including a starter contact, intermediate contacts and a terminating contact, a sweep arm and electrical impulse means adapted to move the sweep arm from one contact to the next, a lead connected in parallel with the starter contact and selected other lead of said contacts, as in an order representing a selected day operation sequence, and extending to and being connected in parallel with the branch controls, a power circuit having one lead connected with the sweep arm of the first said stepper means and having the other lead connected with the sweep arm of the second said stepper means, a lead from the terminal contact of the first said stepper means to the sweep-arm-impulse-means of the second said stepper means and means at the terminating contact of the second said stepper means adapted to return its sweep arm to its starter contact.

2. The combination with a cyclically-repeating timer-impulser of a clock type adapted to provide a sequence of electrical impulses during a portion of the cycle of operation as during a selected time-portion of a day and with a group of electrically-operable branch controls, such as the controls at the branch lines of a sprinkler system, of an electrical switching circuit adapted to operate the group of controls in a consecutive sequence responsive to the sequence of the timer-impulser impulses, to cease operation responsive to the final impulse of a cycle of operation of the impulser, and to repeat such sequential operations during only selected cycles of operation of the timer-impulser as during only selected days in a series of days, and comprising a stepper switch having a series of contacts and a sweep arm adapted to shift from one contact to another responsive to an electrical impulse from said timer-impulser, the contacts including a starter contact, an intermediate contact for each branch control of the group and being connected by a lead thereto and a terminal reset contact, the electrical impulses from said timer-impulser being of a number adapted to shift the sweep arm to the terminal contact upon the final impulse in a cycle, reset means at the terminal contact adapted to release the sweep arm to return the starter contact and to produce an electrical impulse by movement of the sweep arm to the terminal contact, a power circuit having one lead thereof connected to the sweep arm and the other lead thereof connected in parallel to the branch controls whereby the circuit at a selected branch control may be closed whenever the sweep arm is at its respective contact, a second stepper switch having a series of contacts and a sweep arm adapted to shift from one contact to another responsive to said electrical impulses produced by movement of the sweep arm of the first said stepper switch to its terminal contact, the contacts of the second said stepper switch, including a starter contact, a group of intermediate contacts and a terminal reset contact having reset means adapted to return the sweep arm to the starter contact when the arm moves to the terminal contact, said second stepper switch being interconnected in a power circuit branch with one connection at the sweep arm and the other connection being at certain of the contacts including the starter contact and selected intermediate contacts, whereby operation of the branch controls will occur only during those cycles of operation of said timer-impulser when the sweep arm of said second stepper switch is contacting one of the selected group of contacts.

3. In the apparatus defined in claim 2, said power circuit being an alternating current supply and including a loop for providing energy for said electrical impulses, said loop including a rectifier and a condenser across one leg thereof adapted to restrict the energy of a given impulse to a limited direct current electrical charge.

4. In an automatic lawn sprinkling control system for opening and closing flow control valves in a cyclic order, the combination of, a timing clock mechanism including timing dial means having a plurality of timing step tabs mounted on said dial means and at least one recycle tab mounted on said dial means; a plurality of flow control valves; a plurality of solenoids for operating said valves; a rotary switch mechanism for completing a circuit through each of said solenoids in a cyclic order for energizing the same; said rotary switch mechanism including a base, a ratchet rotatably mounted on said base, and a contact arm fixedly connected to said ratchet, for completing the circuits through said solenoids; said rotary switch mechanism further including a spring interconnected between said base and said ratchet for maintaining a retractive force on the ratchet for normally rotating said ratchet in a retracting direction back to a cycle starting position; a first relay operated pawl mounted on said base for rotating the ratchet in an advancing direction away from said cycle starting position; means operated by said timing step tabs for completing a circuit to actuate said first relay operated pawl; a second relay operated pawl for holding the ratchet in an advanced position against the retractive force of said spring; said means including means operated by said recycle tab for completing a circuit to actuate said second relay operated pawl to release the ratchet and allow the spring to return the ratchet and the contact arm back to said cycle starting position.

5. In a control circuit for a plurality of electrically actuated control stations, such as electrically operated valves controlling the flow of water through a series of branch lines of a sprinkler system, the combination of cyclic timing control means for producing electrical impulses at preselected intervals; a first electrically operated stepping means actuated in increments to successive positions by electrical impulses and automatically resettable in response to a predetermined number of impulses; means controlled by said cyclic timing control means for impulse actuating said first stepping means in increments to said successive positions and causing said automatic resetting of said stepping means through said predetermined number of electrical impulses; means for electrically actuating said control stations in sequence and in response to electrical impulses from said first stepping means at said successive positions; a second electrically operated stepping means actuated in increments to successive positions by electrical impulses and automatically resettable in response to a predetermined number of impulses; means for impulse actuating said second stepping means in increments and controlled by the impulse which causes automatic resetting of said first stepping means; and means connecting said second stepping means simultaneously with all of said control stations for controlling the actuation of said control stations by said first stepping means, said connecting means being constructed and arranged to render said first stepping means operative to effect actuation of said control stations in succession by said first stepping means at selected positions of said second stepping means and to render said first stepping means inoperative to effect actuation of said control stations at other selected positions of said second stepping means.

References Cited in the file of this patent

UNITED STATES PATENTS

| | | |
|---|---|---|
| 2,236,297 | Reid | Mar. 25, 1941 |
| 2,281,262 | Breitenstein | Apr. 28, 1942 |
| 2,318,969 | Reynolds | May 11, 1943 |
| 2,333,888 | Robbins | Nov. 9, 1943 |
| 2,467,574 | Williams | Apr. 19, 1949 |
| 2,674,490 | Richards | Apr. 6, 1954 |
| 2,721,101 | Richard | Oct. 18, 1955 |
| 2,805,368 | Nicholaus et al. | Sept. 3, 1957 |
| 2,812,976 | Hasenkamp | Nov. 12, 1957 |
| 2,875,428 | Griswold | Feb. 24, 1959 |